US011320345B2

(12) United States Patent
Korwan et al.

(10) Patent No.: US 11,320,345 B2
(45) Date of Patent: May 3, 2022

(54) ADJUSTABLE VOLUME SAMPLING SYSTEM (AVSS)

(71) Applicant: Avantor Fluid Handling, LLC, Eatontown, NJ (US)

(72) Inventors: Timothy Korwan, Reading, MA (US); Tat Yuen, Old Bridge, NJ (US)

(73) Assignee: Avantor Fluid Handling, LLC, Eatontown, NJ (US)

( * ) Notice: Subject to any disclaimer, the term of this patent is extended or adjusted under 35 U.S.C. 154(b) by 172 days.

(21) Appl. No.: 16/819,448

(22) Filed: Mar. 16, 2020

(65) Prior Publication Data

US 2020/0300734 A1    Sep. 24, 2020

Related U.S. Application Data

(60) Provisional application No. 62/819,897, filed on Mar. 18, 2019.

(51) Int. Cl.
| | | |
|---|---|---|
| *B01L 3/00* | (2006.01) | |
| *G01N 1/14* | (2006.01) | |
| *B01L 3/02* | (2006.01) | |

(52) U.S. Cl.
CPC .............. *G01N 1/14* (2013.01); *B01L 3/0282* (2013.01); *B01L 3/0289* (2013.01); *B01L 2300/047* (2013.01); *B01L 2300/048* (2013.01); *B01L 2300/0832* (2013.01); *B01L 2300/123* (2013.01); *B01L 2300/168* (2013.01)

(58) Field of Classification Search
CPC ........ B01L 3/0282; B01L 3/0289; B01L 3/02; B01L 2300/048; B01L 2300/0832; B01L 2300/123; B01L 2300/168

USPC .................................................. 422/516, 500
See application file for complete search history.

(56) References Cited

U.S. PATENT DOCUMENTS

| | | | |
|---|---|---|---|
| 6,312,950 B1 * | 11/2001 | Ohmura ............... | A61M 1/3633 100/37 |
| 2002/0185457 A1 | 12/2002 | Smith et al. | |
| 2005/0106075 A1 | 5/2005 | Kitazawa | |
| 2007/0178018 A1 | 8/2007 | Virno | |
| 2008/0199900 A1 | 8/2008 | Signore et al. | |
| 2016/0160173 A1 | 6/2016 | Johnson et al. | |

FOREIGN PATENT DOCUMENTS

WO      20140120797 A1    8/2014

OTHER PUBLICATIONS

Extended European Search Report dated Jul. 20, 2020 in European Application No. 20164033.1.

* cited by examiner

*Primary Examiner* — Christine T Mui

(74) *Attorney, Agent, or Firm* — Faegre Drinker Biddle & Reath LLP

(57) ABSTRACT

An adjustable volume sampling system is disclosed for aseptically retrieving a sample volume of a fluid from an origination container. The system includes a sampling container. A cap is removably attached to the sampling container so as to close off the open top. The cap includes two ports. A first tube is attached to one of the ports. An elongated diptube extends through port into the sampling container and an upper end of the diptube is located inside a portion of the first tube. The diptube can be raised and lowered relative to the sampling container by pinching an stretching the first tube. Syringes are provided for expelling excess material from the sampling container.

18 Claims, 5 Drawing Sheets

ADJUSTABLE VOLUME SAMPLING SYSTEM (AVSS)

RELATED APPLICATION

The present application is related to and claims priority from U.S. Provisional Application No. 62/819,897 filed Mar. 18, 2019, the disclosure of which is incorporated herein by reference in its entirety.

FIELD OF THE INVENTION

The invention pertains to obtaining fluid samples aseptically and, more particular, to a method of obtaining a specified sample size while reducing the risk of contamination of the sample.

BACKGROUND AND PRIOR ART

A common way of obtaining a fluid sample of a specified volume is the use of a pipette. Using a pipette involves removing the cap of the origination container which contains the fluid being investigated to obtain a sample of fluid in the pipette. However, once the cap on the origination container is removed, the container is exposed to potential contamination of the sample.

For many laboratory and medical procedures it is important to aseptically obtain a sample. A need exists for reducing the risk of this contamination of a sample while also enabling flexibility and accuracy in terms of delivering a specified sample size.

BRIEF SUMMARY OF THE INVENTION

The invention allows a tube (henceforth called the "diptube") inside a sealed sampling container (e.g. a conical tube) to be raised or lowered based on how much of a fluid sample is desired to be contained in the sampling container. The fluid of interest is first transferred into the sampling container via the diptube to a level above the lower end of the diptube. Thereafter, the excess volume above the lower end of the diptube is removed via the diptube using filtered air injected into the sampling container through a separate port.

In particular, the invention relates to an adjustable volume sampling system for aseptically retrieving a sample volume of a fluid from an origination container. The system includes a sampling container into which a desired amount of a sample material is to be collected. The sampling container includes a sidewall with an open top defined by a neck of the sidewall, and a closed bottom. The sidewall and bottom define an internal cavity. A cap is removably attached to the neck of the sampling container so as to close off the open top. The cap includes a plug portion that slides against the neck of the sidewall. The plug portion provides an airtight, aseptic seal between the cap and the neck of the sampling container.

The cap has first and second ports extending upward from the cap, each port including an inner conduit extending from an upper end of the port to the internal cavity of the sampling container so as to permit the passage of gas or fluids into and out of the sample container An enlarged portion protrudes laterally from a side of the port, the enlarged portion having an outer diameter greater than an outer diameter of the port.

A first tube is attached to the first port. The first tube has an inner diameter that is smaller than the outer diameter of the enlarged portion of the first port such that an end of the first tube is stretched to attach to the enlarged portion of the first port thereby providing an airtight, aseptic seal The first tube is flexible so as to be capable of being pinched and stretched.

A second tube is attached to the second port. The second tube has an inner diameter that is smaller than the outer diameter of the enlarged portion of the second port such that an end of the second tube is stretched to attach to the enlarged portion of the second port thereby providing an airtight, aseptic seal.

An elongated diptube extends through the inner conduit of the first port such that a lower end of the diptube is positioned inside the sampling container and an upper end of the diptube is located inside a portion of the first tube above the upper end of the first port. The diptube has a conduit extending between its upper end and its lower end for permitting the passage of gas or fluid into or out of the sampling container. The diptube has an outer diameter that is sized to slide within the inner conduit of the first port so as to provide a fluid tight seal while permitting the diptube to be raised and lowered relative to the sampling container. The diptube has a length that extends into the sampling container and can reach the bottom of the sampling container while still projecting past the upper end of the first port.

The system includes a three way connector with a main tube and two branch tubes. The main tube is connected to an end of the second tube. A collection tube is connected at one end to one of the branch tubes.

A collection syringe is connected to an opposite end of the collection tube. A collection clamp is attached to the collection tube for controlling flow between the collection syringe and the branch tube along the collection tube.

A purge tube is connected at one end to the other of the branch tubes. A purge syringe is connected to an opposite end of the purge tube. A purge clamp is attached to the purge tube for controlling flow of air between the purge syringe and the branch tube along the purge tube.

In one embodiment, the sampling container is cylindrical and at least partially transparent or translucent. The sampling container may include graduations or markings on its side so as to facilitate the positioning of the lower end of the diptube.

The enlarged portion of each of the ports is preferably a series of barbs.

The first and second tubes are preferably made from SILASTIC® silicone elastomer sold by Dow Corning Corporation, or thermoplastic elastomer (TPE) material.

The system may include an adjustment mechanism mounted to the first tube at a location below the upper end of the diptube and above the upper end of the first port. The adjustment mechanism is configured to press the first tube laterally into the diptube and to stretch or compress the first tube axially at the point where it is pressed into the diptube so as to slide the diptube relative to the first port.

In one embodiment the mechanical adjustment mechanism includes at least one cam member rotatably mounted to a frame and adjacent to the first tube. The cam member has an outer surface with a contour that defines at least one laterally protruding surface and at least one recessed surface. The laterally protruding surface is located on the cam member such that when the cam member is rotated, the laterally protruding surface pushes the first tube into the diptube. The recessed surface is located on the cam member such that when the cam member is rotated so that the recessed surface is adjacent to the first tube and the first tube is not pushed into the diptube. The rotation of the cam member causes the first tube to stretch or compress above and below where the protruding surface presses the first tube into the diptube.

The mechanical adjustment mechanism in one embodiment includes two cam members rotatably mounted to a frame on either side of the first tube, each cam member having an outer surface with a contour that defines at least one laterally protruding surface and at least one recessed surface. The laterally protruding surface is located on each cam member such that when the cam members are rotated the laterally protruding surfaces of the two cam members push the first tube into the diptube. The recessed surfaces are located on the cam members such that when the cam members are rotated so that the recessed surfaces are adjacent to the first tube, the first tube is not pushed into the diptube. The rotation of the cam member causes the first tube to stretch or compress above and below where the protruding surface presses the first tube into the diptube.

Each cam member includes a gear. The gears of the two cam members meshing such that rotation of one cam member causes concomitant rotation of the other cam member. The cam members are mounted so the protruding surfaces contact the first tube at the same time when the cams are rotated.

In an embodiment, one of the cam members includes an adjustment knob that permits rotation of the cam member.

The mechanical adjustment mechanism may include a rotary motor attached to one cam member for rotating the cam member.

In one embodiment, the mechanical adjustment mechanism may include a clamp mounted to a frame and adjacent to the first tube, the clamp configured to constrict the first tube into the diptube. A linear translator is configured to translate the first tube at the location where it is constricted toward or away from the cap so as to cause the first tube to stretch or compress above and below where it is constricted.

A method of controlling the volume of a sample using the adjustable volume sampling system is also disclosed. The method involves the steps of:

(a) constricting the first tube into the diptube;

(b) translating the constricted first tube and diptube toward or away from the cap so as to cause the lower end of the diptube to move upwards or downwards inside the sampling container;

(c) repeating steps (a) and (b) until the lower end of the diptube is at a desired location within the sampling container;

(d) connecting the first tube to an origination container which contains a sufficient amount of material to be sampled;

(e) starting with no air in the collection syringe, actuating a plunger on the collection syringe to draw air from the sampling container along the second tube and the collection tube, and to draw sample material from the origination container into the sampling container until the material in the sampling container is above the lower end of the diptube; and (f) starting with the purge syringe containing air, actuating a plunger on the purge syringe to force the air from the purge syringe along the purge tube and the second tube and into the sampling container, the air forcing sample material from the sampling container into the lower end of the diptube until the level of the sample material in the sampling container is below the lower end of the diptube.

In one embodiment, the method involves prior to step (e) the step of closing the purge clamp and opening the collection clamp.

In one embodiment, the method involves prior to step (f) the step of closing the collection clamp and opening the purge clamp.

Preferably, the step (e) involves creating a vacuum inside of the sampling container and along the first tube.

Preferably after step (f) the method involves the step of continuing to actuate the plunger on the purge syringe so as to cause air to drive any liquid in the first tube into the origination vessel.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

DETAILED DESCRIPTION OF THE INVENTION

Figure 3:
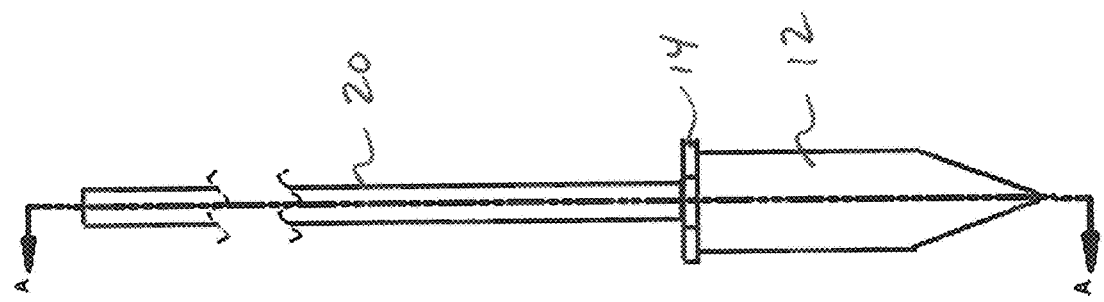
FIG. 3 is a side view of the sampling tube of FIG. 1.
Figure 2:
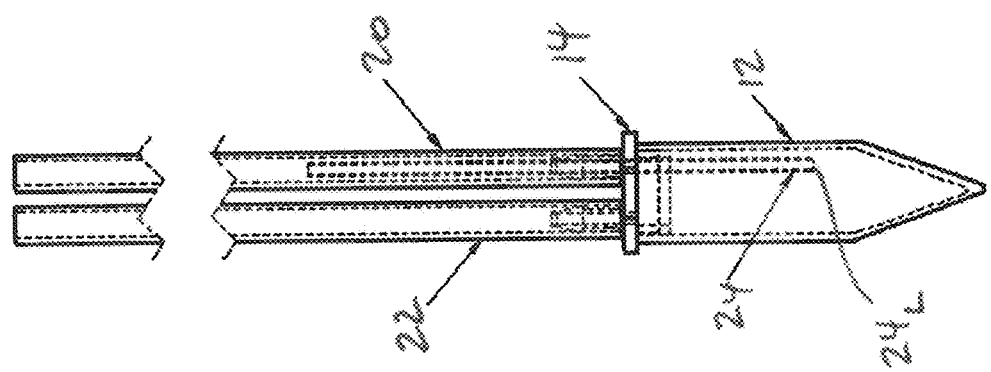
FIG. 2 is an illustration of the sampling tube and tubes of FIG. 1 depicting the internal features using hidden lines.
Figure 1:
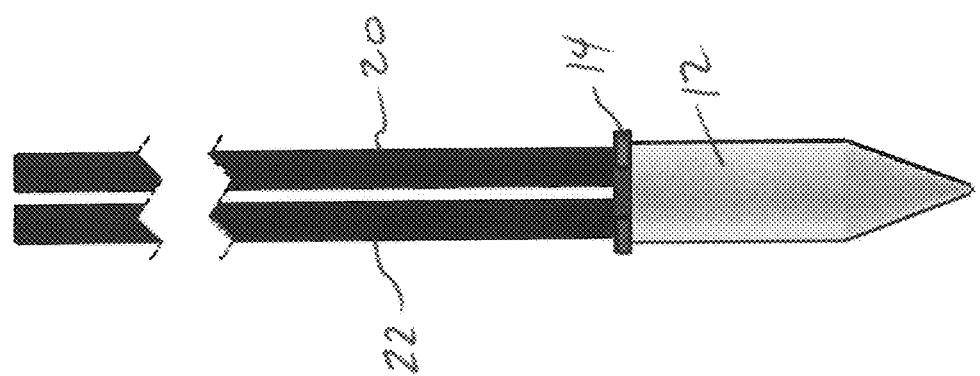
FIG. 1 is an illustration a sampling container with a cap that has two flexible tubes connected to the cap.
Figure 4:
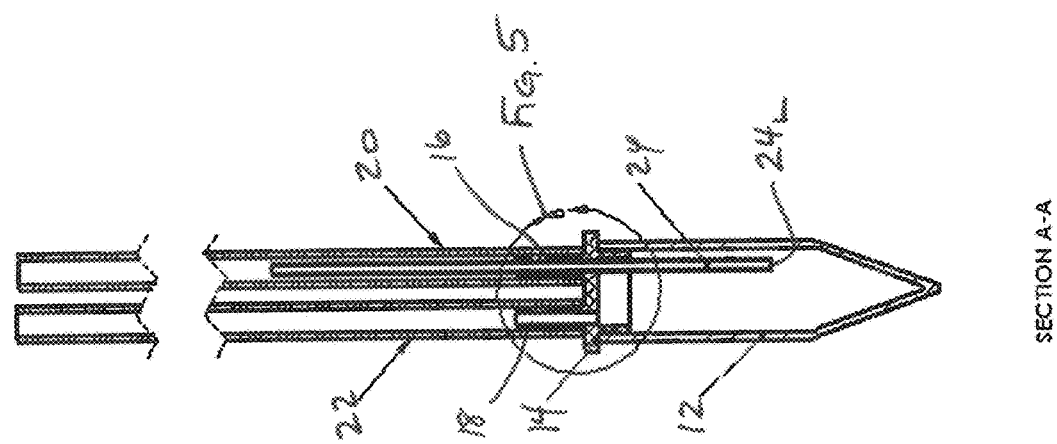
FIG. 4 is a cross-sectional view taken along lines A-A in FIG. 3 illustrating the inside of the sampling container and the diptube.
Figure 5:
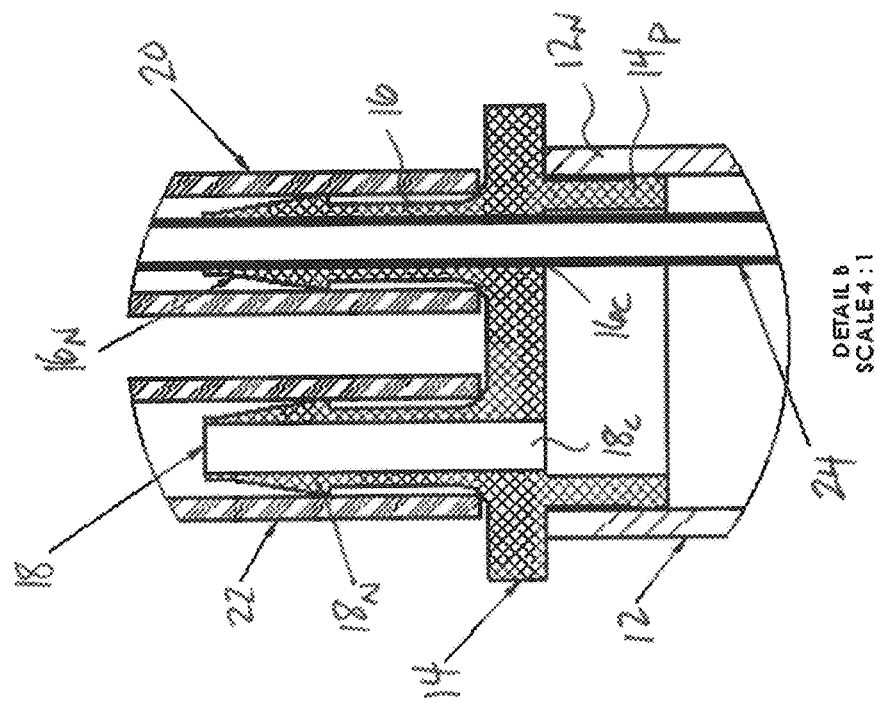
FIG. 5 is an enlarged view of the top of sampling container of FIG. 4 showing the barbed ports of the cap and the attachment of the flexible tubes and dip tube to the sampling container.
Figure 6:
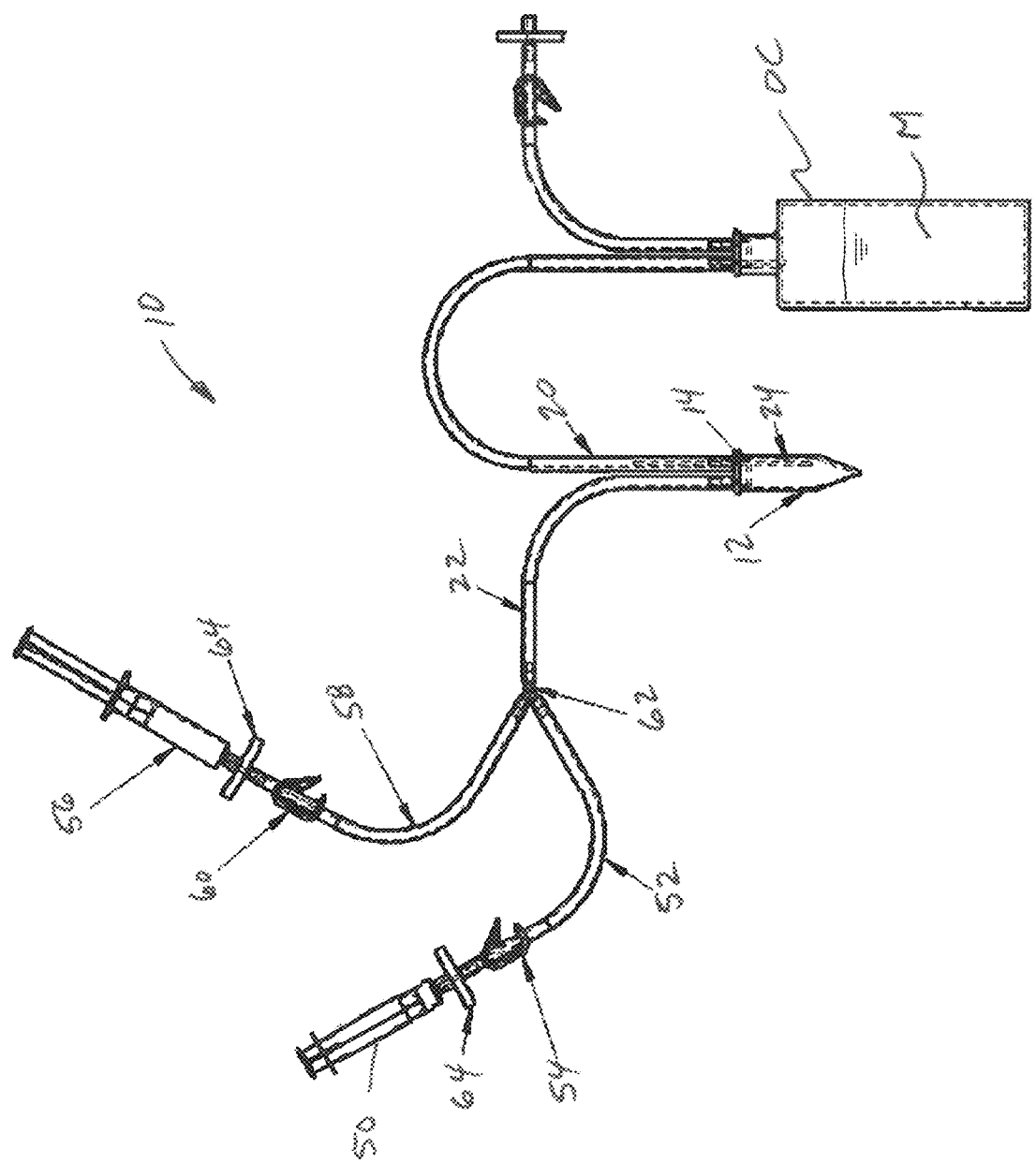
FIG. 6 illustrated the one embodiment of the invention showing other components of the system.

Referring to the drawings, preferred embodiments of the invention are disclosed. The invention is directed to a system 10 for aseptically retrieving a precise sample volume of a fluid from a collection or origination container OC. Referring to FIG. 6, an overview of the various components of the system 10 are shown, including the origination container OC containing a supply of fluid material M being tested. The system 10 includes a sampling container 12 into which a desired amount of the material M is to be collected. The sampling container 12 may be a cylindrical sampling tube or other container similar to those currently used in laboratory settings. The sampling container 12 is preferably at least partially transparent or translucent so that a user can view the amount of the sample of material contained in the sampling container 12. A cap 14 seals off an open top of the sampling container 12. Referring to FIGS. 1-5, the sampling container 12, including the cap 14 is shown in more detail. The cap 14 preferably includes a plug portion 14p that slides into and seals against the inside diameter of the neck 12N of the sampling container 12. The seal is designed to provide an airtight, aseptic seal between the cap 14 and the neck of the sampling container 12. The sampling container 12 and cap 14 can be made of any laboratory or medical grade material commonly used in the industry.

The cap 14 also includes at least two integral upwardly projecting first and second ports 16, 18. The first and second ports 16, 18 are configured to attach to first and second flexible tubes 20, 22. More specifically the ports 16, 18 include enlarged ends or, more preferably one or more flexible barbs $16_N$, $18_N$ that are located on and extend from the outer circumference of the port and sized slightly larger than the internal diameter of the flexible tubes 20, 22 such that the attachment of the first and second flexible tubes 20, 22 to the respective first and second ports 16, 18 provide an air tight aseptic seal preventing air from entering into or exiting from the seal. The ports 16, 18 each have an inner conduit $16_C$, $18_C$ with open ends at the upper and lower ends of the port so as to permit the passage of gas or fluids into and out of the sample container 12 as discussed below. The first and second flexible 20, 22 are preferably made from conventional laboratory-grade materials, such as SILAS-TIC® silicone elastomer sold by Dow Corning Corporation, or thermoplastic elastomer (TPE) material. As will be discussed below, the first flexible tube 20 must be able to stretch and compress elastically within the region above the first port 16.

A diptube 24 is positioned with one end in the sampling container 12 and the other end located inside the first flexible tube 20. The diptube 24 has an outer diameter that is sized to slide within the inner conduit $16_C$ of the first barbed port 16 while still providing a fluid tight seal. The diptube 24 has a length that extends into the sampling container 12 and can reach the bottom of the sampling container 12 while still projecting past the top of the first barbed port 16 a sufficient distance to permit grasping of the diptube 24 through the flexible tubing 20 as will be discussed in more detail below. The sliding seal of the diptube 24 in the first barbed port 16 allows the diptube 24 to be raised and lowered relative to the sampling container 12. The diptube 24 can be made from any laboratory or medical grade material commonly used in the industry, provided that the material is sufficiently rigid that will not crush under the anticipated compression loads as discussed below.

In order to position the lower end 24L of the diptube 24 in the sampling container 12, the present invention utilizes a novel technique. The present invention contemplates compressing or pinching the first flexible tube 20 such that its wall comes into contact with and grips the upper portion of the diptube 24 located above the first port 16. The diptube 24 has a rigidity that is greater than the rigidity of the first flexible tube 20, such that the pinching or squeezing of the first flexible tube 20 by a user allows the gripping of the diptube 24 through the first flexible tube 20 without crushing the diptube 24. While the diptube 24 is gripped by the pinched first flexible tube 20, the movement upward or downward of the first flexible tube 20 at the location where it is pinched against the diptube 24 causes the first flexible tube to compress and stretch, respectively, above and below the pinched location. Since the first flexible tube 20 is pinched against the diptube 24, the upward or downward movement urges the diptube 24 to move in the same upward or downward direction thereby raising or lowering the lower end 24L of the diptube 24 relative to the sampling container 12. When the gripping or pinching is released, the first flexible tube 20 will return to is unstretched or compressed condition while the lower end of the diptube 24 will remain in its new location relative to the sampling container 12. This permits external control over and movement of the diptube 24. As noted above, the diptube 24 must be sufficiently rigid so that it can be gripped through the first flexible tube 20 while still flexible enough to bend laterally to reach the nadir of the sampling container 12.

Figure 8:
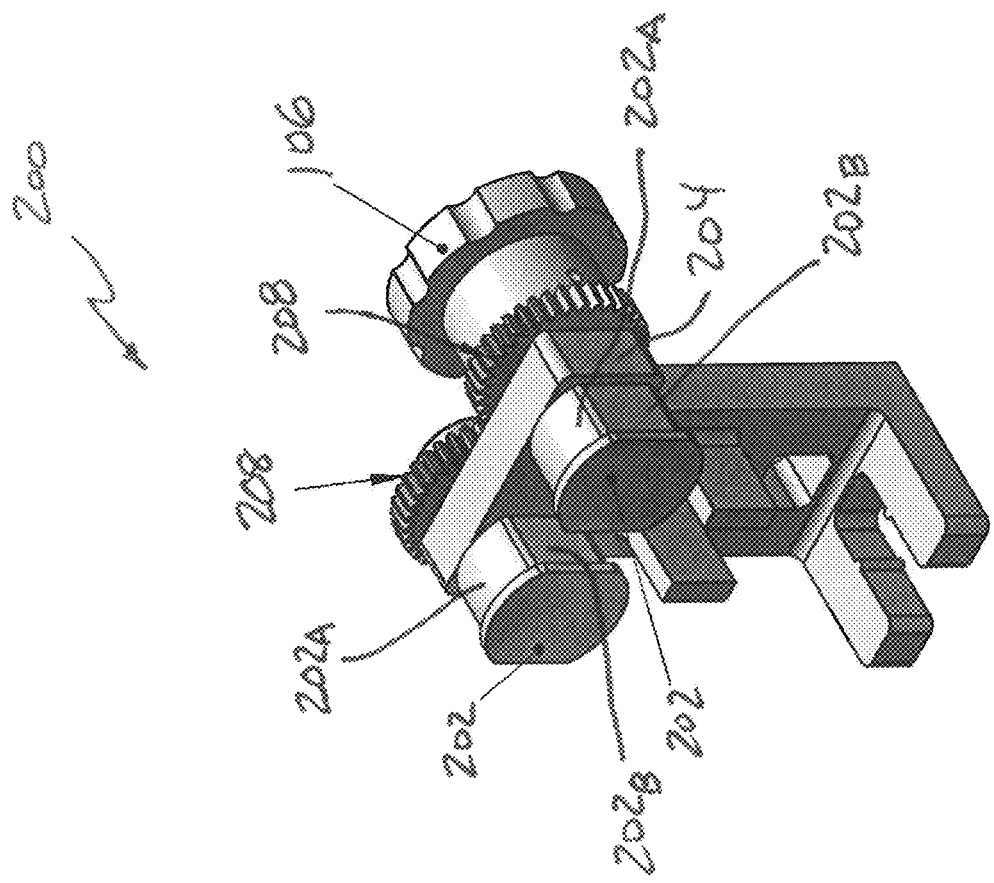
FIG. 8 is another embodiment of an adjustment mechanism for use in the present invention.

The present invention contemplates that the pinching or constricting of the first flexible tube 20 on the diptube 24 for positioning of its lower end 24L could be done by a user's fingers. However, it is more preferable that the constricting of the first flexible tube 20 and the stretching of the tube is undertaken using a mechanical or an electro-mechanical diptube position adjustment mechanism. Two preferred adjustment mechanisms are shown in FIGS. 7 and 8.

The mechanical adjustment mechanisms 100, 200 work by applying a pinching force to constrict the first flexible tube 20 so as to grip the diptube 24, moving the diptube 24 up or down (stretching and compressing the first flexible tube 20, and then releasing the grip on the diptube 24 by reducing the pinching force. The process is repeated until the lower end of the diptube is at the desired location relative to the sampling container 12. Both illustrated embodiments provide the pinching and vertical movement using two cam members 102, 202.

Figure 7:
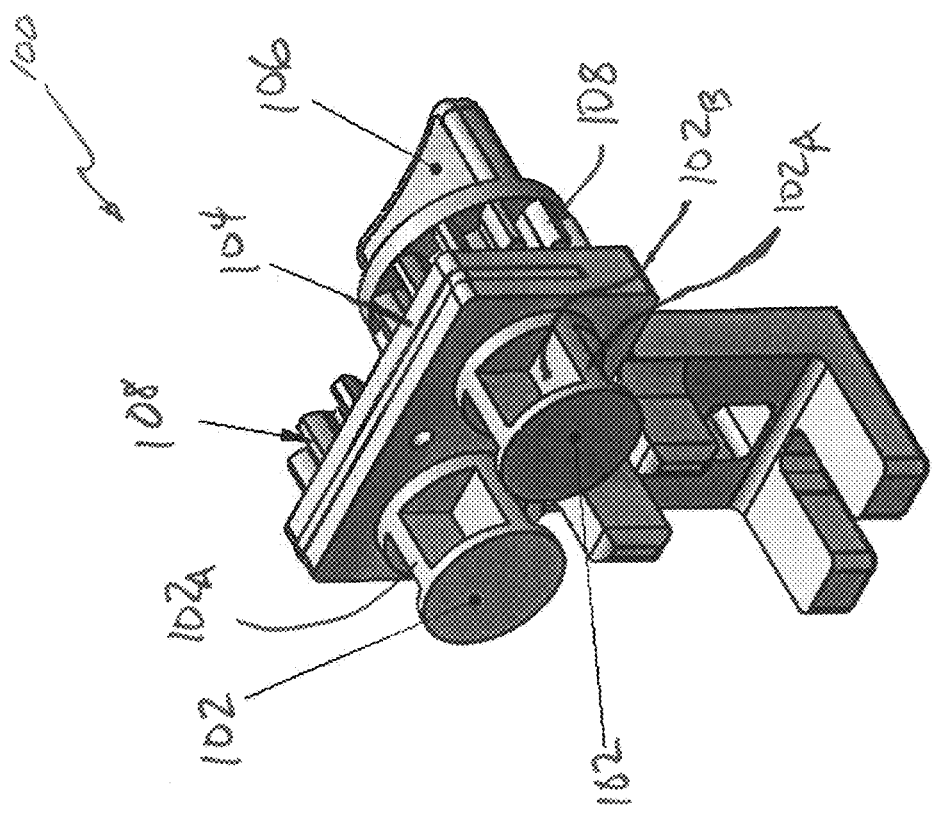
FIG. 7 is an embodiment of an adjustment mechanism for use in the present invention.
Figure 7A:
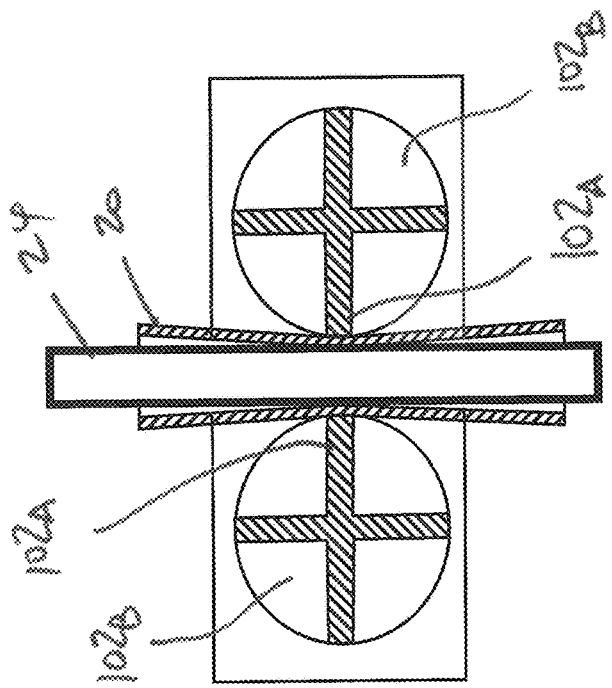
FIGS. 7A and 7B are schematic cross-sectional views of the cam members in the adjustment mechanism of FIG. 7.
Figure 7B:
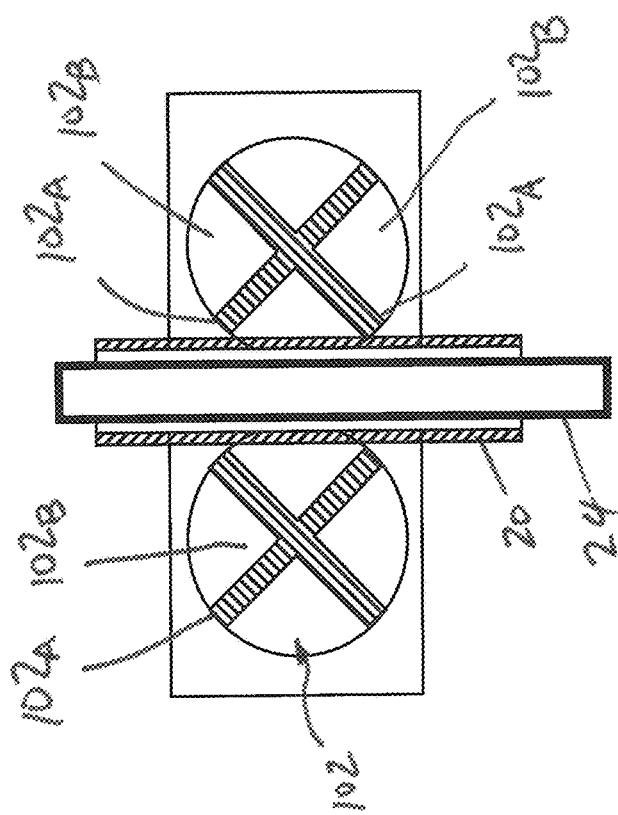

Referring to FIG. 7, there are two cam members 102 mounted side-by-side to a frame 104. Each cam member 102 includes a series of laterally protruding surfaces 102A, with adjacent protruding surface 102A spaced apart from each other by a recess 102B (see FIG. 7A). The cam members 102 are shaped and spaced apart from one another such that when the recesses 102S face one another, the spacing between the recesses 102S is substantially the same as the diameter of the first flexible tube 20 (FIG. 7A), and when the protruding surfaces 102A face one another, the spacing between the protruding surfaces 102A is sufficiently close to cause the first flexible tube 20 to constrict against the diptube 24 and provide a gripping force on the diptube 24 (FIG. 7B). One of the cam members 102 includes an adjustment knob 106 that permits rotation of the cam member 102. In order to allow one knob 106 to control both cam members 102 and to provide for alignment of the protruding surfaces 102A each cam member preferably includes a gear 108 that messes with the gear 108 on the adjacent cam member 102. As such, rotation of the knob 106 causes the associated gear to rotate the gear 108 on the other cam member 102.

As the adjustment knob 106 is rotated and the protruding surfaces 102A constrict the first flexible tube 20 against the diptube, further twisting of the adjustment knob 106 causes the cam members 102 to urge the first flexible tube 20 and diptube 24 upward or downward (depending on the direction of rotation of the knob 106) thereby raising or lowering the lower end of the diptube inside the sampling container 12. Continued rotation of the knob 106 will continue to move the diptube 34 upwards or downwards until the desired height of the lower end 24L of the diptube is achieved.

Referring to FIG. 8, similar to the embodiment in FIG. 7, each cam member 202 includes at least two laterally protruding surfaces 202A, with adjacent protruding surfaces 202A spaced apart from each other by a recess or non-protruding portion 202B. The cam members 202 are shaped and spaced apart from one another such that when the non-protruding portions 202B face one another, the spacing between the non-protruding portions 202B is substantially the same as the diameter of the first flexible tube 20, and when the protruding surfaces 202A face one another, the spacing between the protruding surfaces 102A is sufficiently close to cause the first flexible tube 20 to constrict against the diptube 24 and provide a gripping force on the diptube 24. One of the cam members 202 includes an adjustment knob 206 that permits rotation of the cam member 202. In order to allow one knob 206 to control both cam members 202 and to provide for alignment of the protruding surfaces 202A each cam member preferably includes a gear 208 that messes with the gear 208 on the adjacent cam member 202. As such, rotation of the knob 206 causes the associated gear to rotate the gear 208 on the other cam member 202.

It is also contemplated that, the cam components after constricting the first flexible tube 20 into the diptube 34 may be configured to move vertically (upward or downward) instead of an arc, mimicking the manual method of moving the diptube up or down.

Moreover, a motor could be attached to either mechanism in FIG. 7 or 8 to replace the knob 106, 206 to provide the rotary motion for rotating the cam members. An electromechanical clamp could be used to constrict the first flexible tube 20 against the diptube 24 and then translated upward or downward to move the diptube. Other mechanisms could be used to provide the desired motions.

The sampling container 12 preferably includes graduations or markings on its side so as to facilitate the positioning of the lower end 24L of the diptube 24 as will be discussed below.

The operation of the present invention will now be described with respect to one preferred embodiment.

In order to increase a sample size within the sampling container 12 (which is determined by the position of the lower end 24L of the diptube 24 within the sampling container 12), the diptube 24 is raised up. This is accomplished as follows:
  i. The first flexible tube 20 is pinched at the location where the top portion of the diptube 34 is located so as to securely constrict the first flexible tube 20 against the diptube. The pinching can be achieved with a user's fingertips or a tool, such as pliers or a clamp, or any of the disclosed mechanisms. The diptube 24 and first flexible tube 20 are both pulled upwards either by the user or the gripping mechanism, a few millimeters. This results in the flexible tube 20 stretching along its length below the point where it is grasped (i.e., between where the first flexible tube 20 is pinched and the cap 14). The diptube 24 is sufficiently rigid that the pinching or clamping does not stretch or materially deform or damage the diptube 24. The sliding connection between the diptube 24 and the barbed port 16 results in the diptube 24 sliding freely as the first flexible tube 20 is stretched.
  ii. When the pinching is released, the first flexible tube 20 returns to its original condition. The diptube 24, however, remains in its new position.
  iii. Steps (i) and (ii) are repeated until the lower end 24L of the diptube 24 is at the desired position.

To decrease the sample size, the lower end 24L of the diptube 24 is lowered in the sampling container 12 by reversing the process as follows:
  i. The first flexible tube 20 is pinched at the location where the top portion of the diptube 34 is located so as to securely constrict the first flexible tube 20 against the diptube. The pinching can be achieved with a user's fingertips or a tool, such as pliers or a clamp, or any of the disclosed mechanisms. The diptube 24 and first flexible tube 20 are both pushed downwards toward the cap 14 either by the user or the gripping mechanism, a few millimeters. This results in the first flexible tube 20 compressing along its length below the point where it is grasped (i.e., between where the first flexible tube 20 is pinched and the cap 14). As noted above, the sliding connection between the diptube 24 and the barbed port 16 again allows the diptube 24 to slide freely as the flexible tube 20 is compressed.
  ii. When the pinching is released, the first flexible tube 20 returns to its original condition. The diptube 24, however, remains in its new position.
  iii. Steps (i) and (ii) are repeated until the lower end 24L of the diptube 24 is at the desired position.

FIG. 6 shows an example of how a sample is obtained using the invention. This preferred embodiment of the procedure for obtaining a sample will now be discussed.

Referring to the embodiment in FIG. 6, the adjustable volume sampling system (AVSS) 10 includes the sampling container 12 and the first and second flexible tubes 20, 22. The sampling system also includes a collection syringe 50, a collection tube 52 and a collection clamp 54 which closes off flow between the collection syringe 50 and collection tube 52. In addition, the sampling system 10 also includes a purge syringe 56, a purge tube 58 and a purge clamp 60 which closes off flow between the purge syringe 58 and purge tube 60. The collection tube 52 and the purge tube 58 connect to the second flexible tube 22, preferably through a yoke 62. The system 10 is connected to the origination vessel OC that contains the material M that is being sampled. The sizes of the syringes 50, 56 are selected to provide sufficient air displacement as will become apparent below.

Prior to use, the entire sampling assembly 10 is sterilized in a conventional manner prior to sampling, such as through the use of gamma irradiation.

The collection syringe 50 starts in the compressed, zero position with no air in the syringe.

The purge syringe 56 starts in the pulled back position so as to contain air inside the syringe.

The sampling assembly 10 is then attached via the first flexible tube 20 aseptically to the origination container OC which contains a sufficient amount of material M that is being sampled so as to provide the desired sample volume.

The operator first sets the desired sample volume by adjusting the diptube 24 by following the previously described adjustment method.

The purge clamp 60 is closed and the collection clamp 54 is opened.

The collection syringe 50 is pulled back creating a vacuum inside of the sampling container 12 and along the first flexible tube 20. This causes liquid from the origination vessel OC to be drawn along first flexible tube 20 and into the sampling container 12. The sample material is pulled into the sampling container 12 to a level above the lower end 24L of the diptube 24.

The collection clamp 54 is closed and the purge clamp 60 is then opened.

Sterile air is delivered into the sampling container 12 by compressing the purge syringe 56 driving air through an air filter 64 and along the purge tube 58 and the second flexible tube 22. This sterile air enters the sampling container 12 and forces excess liquid from the sampling container 12 back into the diptube 24 and along the first flexible tube 20 until the height of the sample in the sampling container (2) is at the lower end 24L of the diptube 24. This results in only the intended sample volume remaining in the sampling container 12.

The operator continues to compress the purge syringe 56 so as to cause additional sterile air to drive the remaining liquid that is captured in the first flexible tube 20 back into the origination vessel (8), thereby purging the first flexible tube 20 of any sample, and reducing product loss.

The present invention is not restricted to the embodiment illustrated and described above, but encompasses variations that would be recognized by a person skilled in the art based on this disclosure. For example, the sampling container 12 does not have to be a conical tube. The cap 14 can be affixed to the sampling container 12 in any manner provided that it creates an aseptic seal. The sampling container 12 does not have to have a cap 14 but could, instead, be a sealed container that includes two or more integral ports 16, 18. The ports 16, 18 can be of any design to interface with the diptube 24 and first and second flexible tubes 20, 22, provided that proper seal results. The material of the flexible tubes 20, 22 can be made of other elastomers. The first and second flexible tubes 20, 22 can be different sizes or made from multiple tubes of different types that are connected to one another. For example, the portion of the first flexible tube 20 that is intended to be pinched and stretched can be made from different material than the remainder of the first flexible tube that connects to the origination container. The barbed ports 16, 18 can be different sizes. The diptube 24 can be moved manually or by any type of mechanism or tool that would accomplish the necessary pinching and permit axial displacement (stretching or compression) of the tube. The flexible tubes are preferably secured to fittings with clamps or zip ties which are not shown in the drawings for clarity.

It is also contemplated that, in addition to either adjustment device 100, 200 discussed above including a motor for controlling the movement of the diptube 24 relative to the sample container 12, the adjustment mechanism can also include motors to automatically controlling the collection and purge syringes, 50, 56. It is contemplated that the frame 104, 204 may include recesses for placement of the collection and purge syringes 50, 56 such that the user, after inserting the first flexible tube 20 into the frame 104, 204, then place each syringe into the appropriate recess. individual motors would then actuate the plungers on each syringe in accordance with the procedure. The user can control the actuation with an on-off switch or, alternatively, the mechanism can use sensors to determine appropriate location of the lower end 24L of the diptube 24 and the proper displacement of the plungers in the syringes 50, 56.

As used herein, the term "engage" is intended to both direct physical engagement through one or more components as well as operative engagement. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower, and upward and downward are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. An adjustable volume sampling system for aseptically retrieving a sample volume of a fluid from an origination container, the system comprising a sampling container into which a desired amount of a sample material is to be collected, the sampling container includes a sidewall with an open top defined by a neck of the sidewall, and a closed bottom, the sidewall and bottom defining an internal cavity;

a cap removably attached to the neck of the sampling container so as to close off the open top, the cap including a plug portion that slides against the neck of the sidewall; the plug portion providing an airtight, aseptic seal between the cap and the neck of the sampling container;

the cap having first and second ports extending upward from the cap, each port including an inner conduit extending through the port from an upper end of the port to the internal cavity of the sampling container so as to permit the passage of gas or fluids into and out of the sample container, and an enlarged portion protruding laterally from a side of the port, the enlarged portion having an outer diameter greater than an outer diameter of the port;

a first tube attached to the first port, the first tube having an inner diameter that is smaller than the outer diameter of the enlarged portion of the first port such that an end of the first tube is stretched to attach to the enlarged portion of the first port thereby providing an airtight, aseptic seal, wherein the first tube is flexible so as to be capable of being pinched and stretched;

a second tube attached to the second port, the second tube having an inner diameter that is smaller than the outer diameter of the enlarged portion of the second port such that an end of the second tube is stretched to attach to the enlarged portion of the second port thereby providing an airtight, aseptic seal;

an elongated diptube extending through the inner conduit of the first port such that a lower end of the diptube is positioned inside the sampling container and an upper end of the diptube is located inside a portion of the first tube above the upper end of the first port, the diptube having a conduit extending between its upper end and its lower end for permitting the passage of gas or fluid into or out of the sampling container, the diptube having an outer diameter that is sized to slide within the inner conduit of the first port so as to provide a fluid tight seal while permitting the diptube to be raised and lowered relative to the sampling container, the diptube having a length that extends into the sampling container and can reach the bottom of the sampling container while still projecting past the upper end of the first port;

a three way connector with a main tube and two branch tubes, the main tube connected to an end of the second tube;

a collection tube connected at one end to one of the branch tubes;

a collection syringe connected to an opposite end of the collection tube;

a collection clamp attached to the collection tube for controlling flow between the collection syringe and the branch tube along the collection tube;

a purge tube connected at one end to the other of the branch tubes;

a purge syringe connected to an opposite end of the purge tube; and a purge clamp attached to the purge tube for controlling flow of air between the purge syringe and the branch tube along the purge tube; and an adjustment mechanism mounted to an external surface of the first tube at a location (i) below the upper end of the diptube, (ii) below an upper end of the first tube and (iii) above the upper end of the first port, the adjustment mechanism mounted to the first tube so that the adjustment mechanism does not directly touch the diptube, the adjustment mechanism configured when actuated to press the first tube laterally into the diptube and to stretch or compress the first tube axially at the point where it is pressed into the diptube so as to slide the diptube relative to the first port.

2. The sampling system of claim 1, wherein the sampling container is cylindrical and at least partially transparent or translucent, the sampling container including graduations or markings on its side so as to facilitate the positioning of the lower end of the diptube.

3. The sampling system of claim 1, wherein the enlarged portion of each of the ports is a series of barbs.

4. The sampling system of claim 1, wherein the first and second tubes are made from silicone elastomer or thermoplastic elastomer (TPE) material.

5. An adjustable volume sampling system for aseptically retrieving a sample volume of a fluid from an origination container, the system comprising a sampling container into which a desired amount of a sample material is to be collected, the sampling container includes a sidewall with an open top defined by a neck of the sidewall, and a closed bottom, the sidewall and bottom defining an internal cavity;

a cap removably attached to the neck of the sampling container so as to close off the open top, the cap including a plug portion that slides against the neck of the sidewall; the plug portion providing an airtight, aseptic seal between the cap and the neck of the sampling container;

the cap having first and second ports extending upward from the cap, each port including an inner conduit extending through the port from an upper end of the port to the internal cavity of the sampling container so as to permit the passage of gas or fluids into and out of the sample container, and an enlarged portion protruding laterally from a side of the port, the enlarged portion having an outer diameter greater than an outer diameter of the port;

a first tube attached to the first port, the first tube having an inner diameter that is smaller than the outer diameter of the enlarged portion of the first port such that an end of the first tube is stretched to attach to the enlarged portion of the first port thereby providing an airtight, aseptic seal, wherein the first tube is flexible so as to be capable of being pinched and stretched;

a second tube attached to the second port, the second tube having an inner diameter that is smaller than the outer diameter of the enlarged portion of the second port such that an end of the second tube is stretched to attach to the enlarged portion of the second port thereby providing an airtight, aseptic seal;

an elongated diptube extending through the inner conduit of the first port such that a lower end of the diptube is positioned inside the sampling container and an upper end of the diptube is located inside a portion of the first tube above the upper end of the first port, the diptube having a conduit extending between its upper end and its lower end for permitting the passage of gas or fluid into or out of the sampling container, the diptube having an outer diameter that is sized to slide within the inner conduit of the first port so as to provide a fluid tight seal while permitting the diptube to be raised and lowered relative to the sampling container, the diptube having a length that extends into the sampling container and can reach the bottom of the sampling container while still projecting past the upper end of the first port;

a three way connector with a main tube and two branch tubes, the main tube connected to an end of the second tube;

a collection tube connected at one end to one of the branch tubes;

a collection syringe connected to an opposite end of the collection tube;

a collection clamp attached to the collection tube for controlling flow between the collection syringe and the branch tube along the collection tube;

a purge tube connected at one end to the other of the branch tubes;

a purge syringe connected to an opposite end of the purge tube; and a purge clamp attached to the purge tube for controlling flow of air between the purge syringe and the branch tube along the purge tube; and an adjustment mechanism mounted to the first tube at a location below the upper end of the diptube and above the upper end of the first port, the adjustment mechanism configured to press the first tube laterally into the diptube and to stretch or compress the first tube axially at the point where it is pressed into the diptube so as to slide the diptube relative to the first port;

wherein the adjustment mechanism includes at least one cam member rotatably mounted to a frame and adjacent to the first tube, the cam member having an outer surface with a contour that defines at least one laterally protruding surface and at least one recessed surface, the laterally protruding surface is located on the cam member such that when the cam member is rotated, the laterally protruding surface pushes the first tube into the diptube, and the recessed surface is located on the cam member such that when the cam member is rotated so that the recessed surface is adjacent to the first tube, the first tube is not pushed into the diptube, wherein rotation of the cam member causes the first tube to stretch or compress above and below where the protruding surface presses the first tube into the diptube.

6. The sampling system of claim 1, wherein the adjustment mechanism includes two cam members rotatably mounted to a frame on either side of the first tube, each cam member having an outer surface with a contour that defines at least one laterally protruding surface and at least one recessed surface, the laterally protruding surface is located on each cam member such that when the cam members are rotated the laterally protruding surfaces of the two cam members push the first tube into the diptube, and the recessed surfaces are located on the cam members such that when the cam members are rotated so that the recessed surfaces are adjacent to the first tube, the first tube is not pushed into the diptube, wherein rotation of the cam member causes the first tube to stretch or compress above and below where the protruding surface presses the first tube into the diptube.

7. The sampling system of claim 6, wherein each cam member includes a gear, the gears of the two cam members meshing such that rotation of one cam member causes concomitant rotation of the other cam member and wherein the cam members are mounted so the protruding surfaces contact the first tube at the same time when the cams are rotated.

8. The sampling system of claim 7, wherein one of the cam members includes an adjustment knob that permits rotation of the cam member.

9. The sampling system of claim 6, wherein the adjustment mechanism includes a rotary motor attached to one cam member for rotating the cam member.

10. An adjustable volume sampling system for aseptically retrieving a sample volume of a fluid from an origination container, the system comprising
   a sampling container into which a desired amount of a sample material is to be collected, the sampling container includes a sidewall with an open top defined by a neck of the sidewall, and a closed bottom, the sidewall and bottom defining an internal cavity;
   a cap removably attached to the neck of the sampling container so as to close off the open top, the cap including a plug portion that slides against the neck of the sidewall; the plug portion providing an airtight, aseptic seal between the cap and the neck of the sampling container;
   the cap having first and second ports extending upward from the cap, each port including an inner conduit extending through the port from an upper end of the port to the internal cavity of the sampling container so as to permit the passage of gas or fluids into and out of the sample container, and an enlarged portion protruding laterally from a side of the port, the enlarged portion having an outer diameter greater than an outer diameter of the port;
   a first tube attached to the first port, the first tube having an inner diameter that is smaller than the outer diameter of the enlarged portion of the first port such that an end of the first tube is stretched to attach to the enlarged portion of the first port thereby providing an airtight, aseptic seal, wherein the first tube is flexible so as to be capable of being pinched and stretched;
   a second tube attached to the second port, the second tube having an inner diameter that is smaller than the outer diameter of the enlarged portion of the second port such that an end of the second tube is stretched to attach to the enlarged portion of the second port thereby providing an airtight, aseptic seal;
   an elongated diptube extending through the inner conduit of the first port such that a lower end of the diptube is positioned inside the sampling container and an upper end of the diptube is located inside a portion of the first tube above the upper end of the first port, the diptube having a conduit extending between its upper end and its lower end for permitting the passage of gas or fluid into or out of the sampling container, the diptube having an outer diameter that is sized to slide within the inner conduit of the first port so as to provide a fluid tight seal while permitting the diptube to be raised and lowered relative to the sampling container, the diptube having a length that extends into the sampling container and can reach the bottom of the sampling container while still projecting past the upper end of the first port;
   a three way connector with a main tube and two branch tubes, the main tube connected to an end of the second tube;
   a collection tube connected at one end to one of the branch tubes;
   a collection syringe connected to an opposite end of the collection tube;
   a collection clamp attached to the collection tube for controlling flow between the collection syringe and the branch tube along the collection tube;
   a purge tube connected at one end to the other of the branch tubes;
   a purge syringe connected to an opposite end of the purge tube; and
   a purge clamp attached to the purge tube for controlling flow of air between the purge syringe and the branch tube along the purge tube; and
   an adjustment mechanism mounted to the first tube at a location below the upper end of the diptube and above the upper end of the first port, the adjustment mechanism configured to press the first tube laterally into the diptube and to stretch or compress the first tube axially at the point where it is pressed into the diptube so as to slide the diptube relative to the first port;
   wherein the adjustment mechanism includes a clamp mounted to a frame and adjacent to the first tube, the clamp configured to constrict the first tube into the diptube, and a linear translator configured to translate the first tube at the location where it is constricted toward or away from the cap so as to cause the first tube to stretch or compress above and below where it is constricted.

11. A method of controlling the volume of a sample using a adjustable volume sampling system for aseptically retrieving a sample volume of a fluid from an origination container, the system comprising
   a sampling container into which a desired amount of a sample material is to be collected, the sampling container includes a sidewall with an open top defined by a neck of the sidewall, and a closed bottom, the sidewall and bottom defining an internal cavity;
   a cap removably attached to the neck of the sampling container so as to close off the open top, the cap including a plug portion that slides against the neck of the sidewall; the plug portion providing an airtight, aseptic seal between the cap and the neck of the sampling container;
   the cap having first and second ports extending upward from the cap, each port including an inner conduit extending through the port from an upper end of the port to the internal cavity of the sampling container so as to permit the passage of gas or fluids into and out of the sample container, and an enlarged portion protruding laterally from a side of the port, the enlarged portion having an outer diameter greater than an outer diameter of the port;
   a first tube attached to the first port, the first tube having an inner diameter that is smaller than the outer diameter of the enlarged portion of the first port such that an end of the first tube is stretched to attach to the enlarged portion of the first port thereby providing an airtight, aseptic seal, wherein the first tube is flexible so as to be capable of being pinched and stretched;

a second tube attached to the second port, the second tube having an inner diameter that is smaller than the outer diameter of the enlarged portion of the second port such that an end of the second tube is stretched to attach to the enlarged portion of the second port thereby providing an airtight, aseptic seal;

an elongated diptube extending through the inner conduit of the first port such that a lower end of the diptube is positioned inside the sampling container and an upper end of the diptube is located inside a portion of the first tube above the upper end of the first port, the diptube having a conduit extending between its upper end and its lower end for permitting the passage of gas or fluid into or out of the sampling container, the diptube having an outer diameter that is sized to slide within the inner conduit of the first port so as to provide a fluid tight seal while permitting the diptube to be raised and lowered relative to the sampling container, the diptube having a length that extends into the sampling container and can reach the bottom of the sampling container while still projecting past the upper end of the first port;

a three way connector with a main tube and two branch tubes, the main tube connected to an end of the second tube;

a collection tube connected at one end to one of the branch tubes;

a collection syringe connected to an opposite end of the collection tube;

a collection clamp attached to the collection tube for controlling flow between the collection syringe and the branch tube along the collection tube;

a purge tube connected at one end to the other of the branch tubes;

a purge syringe connected to an opposite end of the purge tube; and a purge clamp attached to the purge tube for controlling flow of air between the purge syringe and the branch tube along the purge tube;

the method comprising the steps of:
 (a) constricting the first tube into the diptube with the adjustment mechanism;
 (b) translating the first tube and diptube toward or away from the cap so as to cause the lower end of the diptube to move upwards or downwards inside the sampling container;
 (c) repeating steps (a) and (b) until the lower end of the diptube is at a desired location within the sampling container;
 (d) connecting the first tube to an origination container which contains a sufficient amount of material to be sampled;
 (e) starting with no air in the collection syringe, actuating a plunger on the collection syringe to draw air from the sampling container along the second tube and the collection tube and creating a vacuum inside of the sampling container and along the first tube, and to draw sample material from the origination container into the sampling container until the material in the sampling container is above the lower end of the diptube; and
 (f) starting with the purge syringe containing air, actuating a plunger on the purge syringe to force the air from the purge syringe along the purge tube and the second tube and into the sampling container, the air forcing sample material from the sampling container into the lower end of the diptube until the level of the sample material in the sampling container is below the lower end of the diptube.

12. The method of claim 11, wherein prior to step (e) the method involves the step of closing the purge clamp and opening the collection clamp.

13. The method of claim 12, wherein prior to step (f) the method involves the step of closing the collection clamp and opening the purge clamp.

14. The method of claim 12, wherein after step (f) the method involves the step of continuing to actuate the plunger on the purge syringe so as to cause air to drive any liquid in the first tube into the origination container.

15. An adjustable volume sampling system for aseptically retrieving a sample volume of a fluid from an origination container, the system comprising a sampling container into which a desired amount of a sample material is to be collected, the sampling container includes a sidewall with an open top defined by a neck of the sidewall, and a closed bottom, the sidewall and bottom defining an internal cavity;

a cap removably attached to the neck of the sampling container so as to close off the open top, the cap including a plug portion that slides against the neck of the sidewall; the plug portion providing an airtight, aseptic seal between the cap and the neck of the sampling container;

the cap having first and second ports extending upward from the cap, each port including an inner conduit extending through the port from an upper end of the port to the internal cavity of the sampling container so as to permit the passage of gas or fluids into and out of the sample container, and an enlarged portion protruding laterally from a side of the port, the enlarged portion having an outer diameter greater than an outer diameter of the port;

a first tube attached to the first port, the first tube having an inner diameter that is smaller than the outer diameter of the enlarged portion of the first port such that an end of the first tube is stretched to attach to the enlarged portion of the first port thereby providing an airtight, aseptic seal, wherein the first tube is flexible so as to be capable of being pinched and stretched;

a second tube attached to the second port, the second tube having an inner diameter that is smaller than the outer diameter of the enlarged portion of the second port such that an end of the second tube is stretched to attach to the enlarged portion of the second port thereby providing an airtight, aseptic seal;

an elongated diptube extending through the inner conduit of the first port such that a lower end of the diptube is positioned inside the sampling container and an upper end of the diptube is located inside a portion of the first tube above the upper end of the first port, the diptube having a conduit extending between its upper end and its lower end for permitting the passage of gas or fluid into or out of the sampling container, the diptube having an outer diameter that is sized to slide within the inner conduit of the first port so as to provide a fluid tight seal while permitting the diptube to be raised and lowered relative to the sampling container, the diptube having a length that extends into the sampling container and can reach the bottom of the sampling container while still projecting past the upper end of the first port;

at least one syringe connected to the second tube for controlling the collection of sample material in the sampling container;

a clamp between the at least one syringe and the second port for controlling flow along the second tube; and an adjustment mechanism mounted to an external surface of the first tube at a location (i) below the upper end of the diptube, (ii) below an upper end of the first tube and (iii) above the upper end of the first port, the adjustment mechanism mounted to the first tube so that the adjustment mechanism does not directly touch the diptube, the adjustment mechanism configured when actuated to press the first tube laterally into the diptube and to stretch or compress the first tube axially at the point where it is pressed into the diptube so as to slide the diptube relative to the first port.

16. The sampling system of claim 15, wherein the adjustment mechanism includes at least one cam member rotatably mounted to a frame and adjacent to the first tube, the cam member having an outer surface with a contour that defines at least one laterally protruding surface and at least one recessed surface, the laterally protruding surface is located on the cam member such that when the cam member is rotated, the laterally protruding surface pushes the first tube into the diptube, and the recessed surface is located on the cam member such that when the cam member is rotated so that the recessed surface is adjacent to the first tube, the first tube is not pushed into the diptube, wherein rotation of the cam member causes the first tube to stretch or compress above and below where the protruding surface presses the first tube into the diptube.

17. The sampling system of claim 16, wherein each cam member includes a gear, the gears of the two cam members meshing such that rotation of one cam member causes concomitant rotation of the other cam member and wherein the cam members are mounted so the protruding surfaces contact the first tube at the same time when the cams are rotated.

18. The sampling system of claim 15, wherein the adjustment mechanism includes a clamp mounted to a frame and adjacent to the first tube, the clamp configured to constrict the first tube into the diptube, and a linear translator configured to translate the first tube at the location where it is constricted toward or away from the cap so as to cause the first tube to stretch or compress above and below where it is constricted.

* * * * *